Aug. 2, 1932. A. J. DOSER 1,869,934
PRESSURE RESPONSIVE INSTRUMENT
Filed Jan. 24, 1931
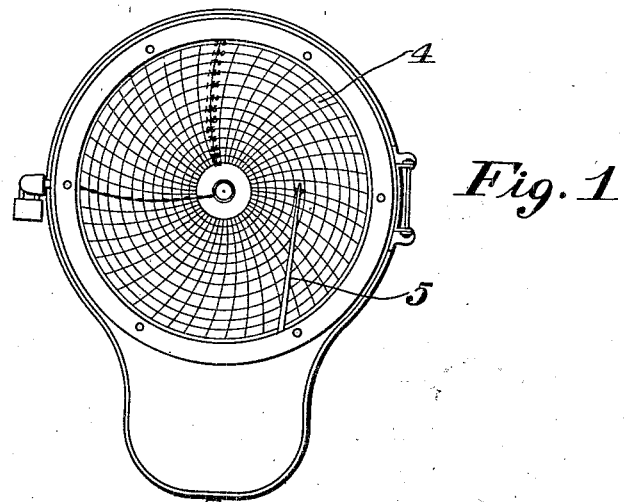
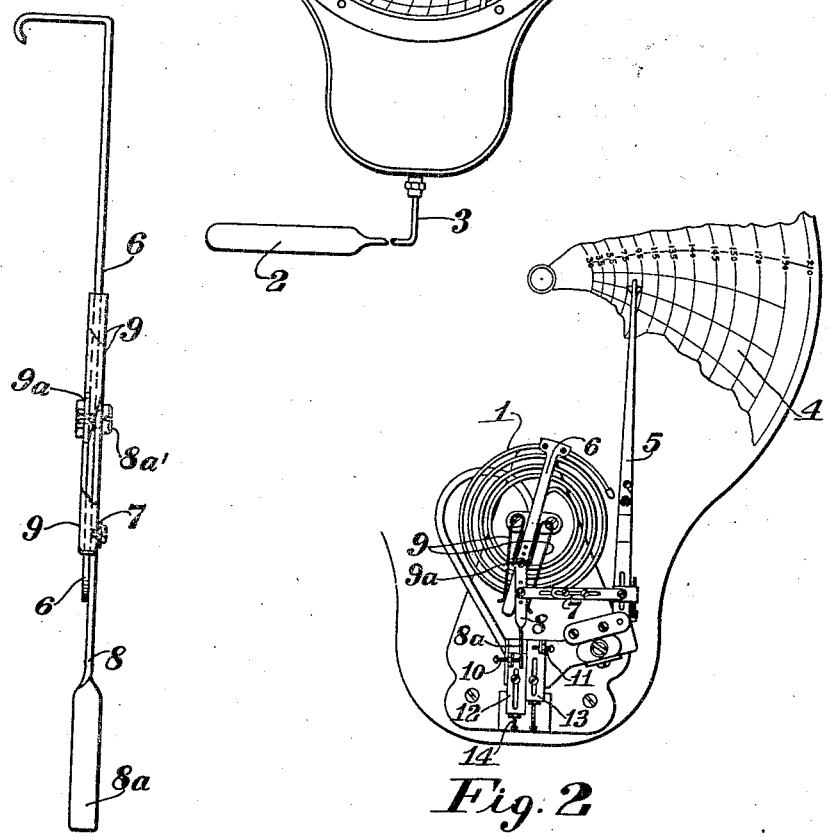
INVENTOR:
Albert J. Doser
BY
Alfred Burger
ATTORNEY Patented Aug. 2, 1932

1,869,934

UNITED STATES PATENT OFFICE

ALBERT J. DOSER, OF ROCHESTER, NEW YORK, ASSIGNOR TO TAYLOR INSTRUMENT COMPANIES, OF ROCHESTER, NEW YORK, A CORPORATION OF NEW YORK

PRESSURE RESPONSIVE INSTRUMENT

Application filed January 24, 1931. Serial No. 511,079.

This invention relates to that general class of devices which include as a motor element a pressure-responsive device, of the Bourdon-tube type, for instance.

In some of the applications of instruments of that type it was found desirable to have open scale readings over a relatively short range and condensed readings over another relatively larger range. Many contrivances have been proposed to accomplish the purpose referred to, but to my knowledge they are all based upon a throttling or choking effect upon the Bourdon spring, i. e. the motor element itself from which the indicating movement is derived. The usual construction includes a resistance for retarding the movement of the Bourdon spring during part of its movement. Such a resistance detrimentally affects the operation of the spring and is generally antagonistic to sound engineering principles.

It is the main object of the invention to produce an instrument of the class referred to, having an open scale portion and a condensed scale portion and corresponding differential rates of movement of the indicator hand, without a substantial retarding action upon the motor element.

For a full understanding of the invention, the principle of operation on which it is based, the points of novelty and the advantage resulting from it, reference is made to the accompanying drawing, wherein:

Fig. 1 is a front view of an instrument embodying the invention;

Fig. 2 is a fragmentary enlarged face view of the mechanism more particularly identified with the invention; and Fig. 3 is a fragmentary edge view on an enlarged scale of the invention.

For the purpose of illustration, reference is made to a temperature recorder which includes as an operative unit a Bourdon tube or spring 1, a bulb 2 and a capillary connection 3. In the particular instance, the unit may be assumed to be filled with a fluid medium whose pressure varies as a function of variations in temperature at the bulb. The changes in volume are accompanied by corresponding changes in pressure in the system, which in turn react upon the Bourdon spring to produce corresponding changes in the position of the free end thereof, all of which is well understood.

The instrument also contains a chart 4 and a pen arm 5 connected with the Bourdon spring for tracing a record on the chart.

As appears from Fig. 1, the chart contains three scale ranges, viz: an inner range indicating temperature values from say 30° to 135°, an outer range indicating values from 150° to 220° and an intermediate range indicating values from 135° to 150°. While the two outer scale ranges are condensed, the intermediate range is open. The particular form of chart or scale and range division is an adaptation for temperature measurements and records in connection with the pasteurization of milk and it is understood that in principle there is no limit in respect to range or divisions thereof.

As appears from Fig. 2, the Bourdon spring 1 carries near its outer or free end an arm 6, usually directly connected to the pen arm 5 by means of the adjustable link 7.

The invention, in the particular embodiment, includes the following mechanism:

The link 7 is pivotally connected to an arm 8 which in turn is connected to the arm 6 for pivotal motion parallel to the plane of the Bourdon spring coil 1 and the arm 6 carries leaf springs 9, which bear laterally upon the arm 8, tending to hold it in alignment with the arm 6. The arm 8 is preferably made of the same width as the arm 6 and the leaf springs 9 are so disposed and have such a width that they simultaneously bear on the sides of both arms. The arm 8 thus can be angularly moved about its pivot and out of alignment with the arm 6 only against the tension of one of the springs 9 and when it is out of alignment the spring which has opposed its movement tends to return it to aligning position.

The force of the springs 9 is so chosen that, in the absence of other factors, they are just sufficient to hold the arms 6 and 8 in alignment against the resistance of the load, i. e. the pen arm 5 and the friction entailed in its operation.

The arm 8 has an extension 8a for cooperation with two abutments in the form of set screws 10 and 11 disposed on opposite sides of the extension 8a for adjustably limiting its motion.

The abutments are preferably mounted on slidable carriages 12 and 13 adjustable by means of set screws 14 or the like.

While the character of the springs 9 may be varied in many ways, I prefer the form of spring construction disclosed. The springs are stamped from flat stock of spring metal and then bent to assume the form shown. They are interconnected by a central bridge piece 9a perforated to be connected to the stud 8a¹ forming the pivot connection between the arm 6 and the arm 8. At the opposite ends of the bridge piece 9a, the springs 9 are bent at right angle to the latter and form loops to give the springs the desired spring action.

The operation is as follows:

Having reference to Fig. 2, the spring 1 is shown in a position corresponding to about 80° F. The arm 8 is out of alignment with the arm 6 being prevented from alignment by abutment 10. With a decrease of temperature, the lower extremity of arm 6 would move still farther to the left and the angular displacement of arm 8 relatively to arm 6 would be increased. With a rise of temperature, the lower end of arm 6 would move to the right and the angular displacement would decrease until a condition of alignment is reached. Upon farther movement of arm 6 to the right, the arm 8 would move away from the abutment and alignment would continue until arm 8 touches the abutment 11. Upon further movement of the lower end of arm 6 to the right, relative angular displacement will again take place since arm 8 is held against further movement by the abutment 11. While the first angular displacement took place against the opposition of the leaf springs 9 to the right, the second angular displacement takes place against the opposition of the leaf spring to the left.

Since between the abutments 10 and 11, the arm 8 is free to move with the arm 6, the effect is the same as though link 7 were directly connected to the arm 6. The rate of transmission of motion from the Bourdon spring 1 to the pen arm 15 is therefore a maximum. During the movement of the arm 6 out of alignment with arm 8, i. e., when the latter is held against movement, the rate of transmission is considerably reduced.

The degree of reduction may be varied by changing the point of connection of link 7 to arm 8 and also by the position of the abutments 10 and 11 in the direction of length of the extension 8a.

The range of division and the points of transition from one rate of transmission to another may be varied by the change of position of the abutments in lateral direction from the extension 8a.

In the foregoing I have described what I now consider as the preferred embodiment of my invention. It is understood that the reduction of the rate of transmission may be accomplished in different ways without deviation from the principle of operation.

The principal advantage of my invention is the simplicity of construction and the ready adjustability to accurately determine the different range divisions and effect calibration of the instrument.

I claim:

1. In instruments of the character described, the combination of a driving device, an element to be moved thereby and motion-transmission mechanism between the device and the said element, including a member connected to the device and moved by the latter to describe a definite path, an arm pivotally connected to said member, resilient means tending to restrain relative motion between the arm and said member, means in the path of motion of said arm and unconnected with said member for limiting the angular motion of the arm, and a connection between the arm and the said element.

2. In instruments of the character described, the combination of a driving device, an element to be moved thereby, and motion-transmission mechanism between the device and the said element, including an arm rigidly connected at one end to the device, a second arm pivotally connected at one end to the first arm, spring means tending to hold the two arms against relative motion, an abutment unconnected with the first arm in the path of motion of the second arm, and a connection between the second arm and the said element.

3. In instruments of the character described, the combination of a driving device, an element to be moved thereby and motion transmission mechanism between the device and the said element, including an arm rigidly connected at one end to the device, a second arm pivotally connected at one end to the first arm, spring means tending to hold the two arms against relative angular motion, adjustable abutments unconnected with the first arm on opposite sides of the second arm in the path of motion thereof, and a connection between the second arm and the said element.

4. In instruments of the character described, the combination of a driving element, a driven element and a motion-transmitting mechanism between the driving element and the driven element, including a member operatively connected with the driving element, an arm pivotally supported by said member, spring means tending to maintain the arm in a fixed position relatively to said member, a connection between the arm and the driven member, and means in the path of motion of the arm and unconnected with said member for intercepting the arm thereby causing it to move about its pivot against the action of the spring means, during a part of the motion of the driving element.

5. In instruments of the character described, the combination of a driving element, a driven element and motion-transmitting mechanism between the driving element and the driven element, including two pivotally interconnected members, one of said members being connected to the driving element and the other to the driven element, springs tending to maintain the two members in a fixed position relatively to one another, and abutments on opposite sides of the member connected with the driven element, in the path of motion thereof, whereby the said members move as a unit between the said abutments but have relative motion when either one of said abutments is effective.

In testimony whereof I affix my signature.

ALBERT J. DOSER.